Figure 3:
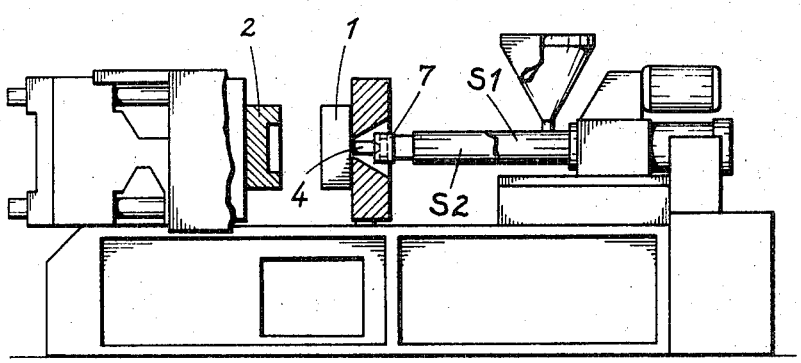

United States Patent
Hünten et al.

[11] 3,837,777
[45] Sept. 24, 1974

[54] PLASTIC MATERIAL INJECTION MOULDING MACHINE

[75] Inventors: Werner Hünten, Stein bei Nurnberg; Erich Untheim, Kalchreuth uber Nurnberg; Dieter Popp, Nurnberg, all of Germany

[73] Assignee: Demag Kunststofftechnik GmbH, Bavaria, Germany

[22] Filed: July 12, 1972

[21] Appl. No.: 270,887

[30] Foreign Application Priority Data
July 16, 1971 Germany............................ 2135792

[52] U.S. Cl.......... 425/247, 425/449, 425/DIG. 224, 425/DIG. 227
[51] Int. Cl............................................... B29f 1/03
[58] Field of Search .........., 425/247, 248, 249, 250, 425/449, DIG. 224, DIG. 225, DIG. 226, DIG. 227

[56] References Cited
UNITED STATES PATENTS

| | | | |
|---|---|---|---|
| 2,842,798 | 7/1958 | Paschold | 425/DIG. 224 |
| 3,052,925 | 9/1962 | Brannenkant et al. | 425/DIG. 227 |
| 3,097,396 | 7/1963 | Ludwig | 425/DIG. 224 |
| 3,241,191 | 3/1966 | Novel | 425/DIG. 225 |
| 3,271,491 | 9/1966 | Mikkelborg | 425/DIG. 224 |
| 3,431,600 | 3/1969 | Bullard et al. | 425/DIG. 224 |
| 3,571,856 | 5/1969 | Voelker | 425/DIG. 225 |

*Primary Examiner*—J. Spencer Overholser
*Assistant Examiner*—Robert J. Craig

[57] ABSTRACT

A plastics material injection moulding machine in which the free end of a sprue runner of the mould is engageable in a complementary shaped orifice of an injection nozzle; the point of separation between the sprue runner of the mould and the injection nozzle being situated at or in the immediate vicinity of a valve of the injection nozzle. The valve comprises an axially displaceable valve body which has at least one annular groove having two interruptions therein. One of the interruptions is located between two openings from injection units and the other is located in the vicinity of the injection nozzle whereby the flows of plastics materials from the injection units are maintained separated until they enter the sprue runner.

13 Claims, 3 Drawing Figures

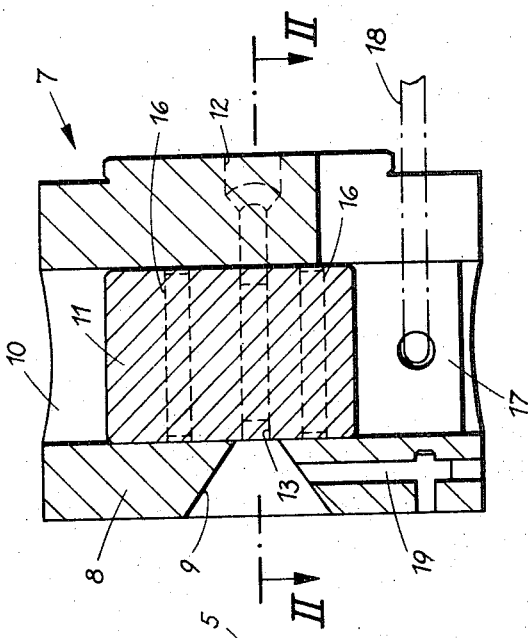
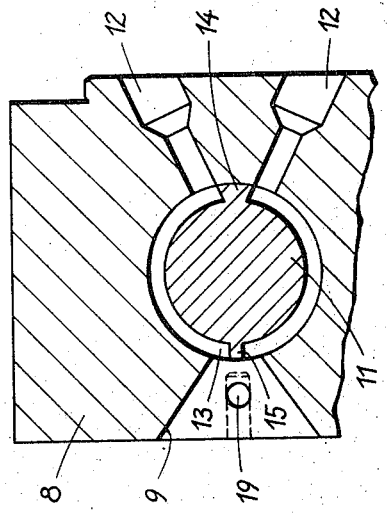
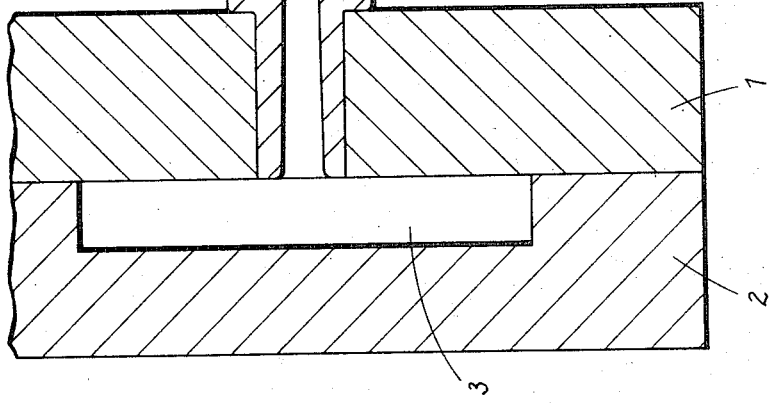
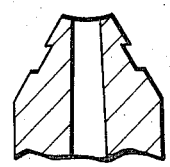
Fig. 1
Fig. 2

PLASTIC MATERIAL INJECTION MOULDING MACHINE

The present invention relates to an improved plastics moulding machine.

Injection moulding machines having a plurality of injection units serve to inject into the hollow mould space synthetic materials of differing colour or of differing nature. More particularly, in the manufacture of injection moulded components by the so-called "sandwich" method injection moulding machines of the above described kind are used which have two injection units through which a plastics material of greater strength or superior grade forming the compact surface of the moulding to be produced and a foamable or prefoamed or lower grade plastics material forming the core of the moulding are respectively injected into the hollow mould space via a sprue runner.

Injection moulding machines of the above described kind are known wherein a valve is disposed in the injection nozzle body and permits to connect selectively one of the two supply passages from the injection units to a duct leading to the nozzle mouth. This duct forms a extension of the sprue runner of the mould when the injection nozzle has been brought up to the mould. It has now been found that with injection moulding machines of this design difficulties arise inasmuch as total release of the sprue slug formed in the normally conical sprue runner cannot be attained and so-called "thread pulling" of still partially plastic synthetic material cannot be prevented with certainty when the injection nozzle is withdrawn from the mould. Also, if after mould release, residual plastics material remains in the spure runner or in the duct leading to the nozzle mouth, then this leads to surface disturbances, e.g., streakiness or discolouration in the subsequent injection-moulded component.

According to the present invention there is provided a machine for the injection moulding of plastics material comprising, an injection nozzle containing a valve, a plurality of injection units for conveying liquefied or plasticised moulding material to the injection nozzle, a sprue runner for communication with a mould cavity, and drive means for placing the sprue runner and injection nozzle in communication, the point of separation of the sprue runner and the injection nozzle being located in the immediate vicinity of the valve.

In this construction, the nozzle duct forming the extension of the sprue runner and extending within the nozzle body has the temperature of the latter and in the short period of time period of time of application to the mould cannot be brought to the temperature necessary for adequate solidification of the plastics material contained in the duct. By virtue of the point of separation between injection nozzle and mould, i.e., sprue runner, being shifted to the valve of the injection nozzle the entire sprue runner lies within the region of the mould and has the temperature thereof. Thus, when the valve is closed after the injection operation, a mechanical separation of the plastics material from the sprue slug results directly upstream of the nozzle-ward opening of the sprue runner, and the slug rapidly solidifies because of the relatively low mould temperature when moulding thermoplastic materials or as a result of the higher temperature when moulding vulcanising or heat-hardening plastics materials. Remains of plastics material being left in the sprue runner after opening the mould is thus definitely precluded.

A further aspect of the invention provides an injection moulding machine comprising an injection nozzle containing a valve having a valve body, a plurality of injection units for conveying liquefied or plasticised moulding material to the injection nozzle, and a sprue runner for communication with a mould cavity and selectively communicable with the injection nozzle, wherein the valve body is displaceable in a bore extending transversely of the longitudinal axis of the sprue runner, a plurality of supply passages from the injection units debouch into the bore in a plane extending substantially transversely of the direction of movement of the valve body, the valve body has an annular groove which is interrupted between two openings of the supply passages as well as in the region of the point of separation between the sprue runner and the injection nozzle. With this arrangement the union of all plastics constituents lies exclusively within the sprue bushing and thus becomes part and parcel of the sprue slug. Thus, no ultimately mixed synthetic material which could detrimentally affect the subsequent injection-moulded component can be left within the valve either, and therefore, in contrast to the valves of known injection moulding machines, it is unnecessary to switch from one injection unit to the other during the injection operation. Moreover, the interruption of the annular groove provided in the region of the point of separation enables the sprue bushing to be advanced until it contacts the valve body, without creating the risk of damage during the switching operation.

The present invention will now be described by way of example, with reference to the accompanying drawings, in which:

FIG. 1 schematically shows a mould of an injection moulding machine having a sprue runner and an injection nozzle, in separated state, FIG. 2 shows a section along line II—II of FIG. 1, from which the construction and arrangement of a valve body in the nozzle body is apparent, and FIG. 3 shows a partly sectional side view of an injection moulding machine according to the invention, having two injection units S1 and S2.

For reasons of clarity any parts of the injection moulding machine which do not directly concern the subject of the present invention have been omitted from the drawing.

FIG. 1 shows a mould consisting of two halves 1 and 2 and having a hollow mould space 3. A sprue bushing 4 is wedged or secured by screwing into an orifice in mould half 1. The sprue housing 4 has a sprue runner 5 which diverges towards the hollow space 3 extending within the sprue bushing 4. A shoulder of the bushing 4 is supported by the external face of the mould half 1 and the nozzle-ward end of the bushing is in the form of a cone 6.

With the sprue bushing 4 having the sprue runner 5 there is associated an injection nozzle which is common to two plastics material injection units (not shown) and which unites the streams of plastics supplied by these units. The injection units comprise, in known manner, injection cylinders wherein a worm or a piston is disposed and which are provided with the conventional arrangements for delivering the synthetic material, for heating the synthetic material and for rotating the worm or driving the piston.

The injection nozzle generally designated by the reference numeral 7 comprises a nozzle body 8 firmly connected, in any suitable manner, to the two injection units. The nozzle body 8 has, at its side facing the mould, a cone-shaped orifice 9 which corresponds to and receives the cone 6 of the sprue bushing 4 when the nozzle 7 is driven towards the mould, or the mould towards the nozzle, thus providing both for the necessary sealing against liquid plastics escaping and for centering the opening of the sprue runner 5. A valve bore 10 extends at right angles to the longitudinal axis of the sprue runner 5 in the nozzle body 8 in which bore a valve piston or valve body 11 is axially displaceable. In the same plane (plane of drawing of FIG. 2) as the orifice 9, two supply passages 12, for two plastics constituents differing as to colour or kind and being supplied by injection units (not shown), open in the valve bore 10.

The valve piston 11 which is displaceable in the valve bore 10 has an annular groove 13 in its peripheral area which groove provides a communication between the supply passages 12 and the orifice 9 of the nozzle body 8 when the piston 11 has been brought into the plane of the supply passages 12 by displacement of the valve piston 11. The width of the annular groove 13 corresponds to the nozzle-ward diameter of the sprue runner 5. In this position the annular groove creates two separate flow paths since, as is shown in FIG. 2, the annular groove 13 is interrupted by a protuberance 14 between the openings of the supply passages 12 into the valve bore 10. Diametrically opposite the protuberance 14 there is a further protuberance 15 interrupting the annular groove 13 which further protuberance creates in the orifice 9 two separate outlets for the differing synthetic materials and which is of major importance for precise separation of the plastics streams up to their entry into the sprue runner 5.

At either side of the annular groove 13 there are further annular grooves 16 in the valve piston 11, which serve for receiving plastics material leaking from the groove 13 and/or a lubricant. The valve piston 11 is adapted for axial reciprocating movement via a one-piece flange-like extension 17 and an only schematically indicated rod system 18. Further, a diversion duct 19 for plastics leakages which may possibly issue between the cone 6 and the orifice 9 opens into the orifice 9 of the nozzle body 8. An annular groove 20 in the outer surface of the cone 6 of the sprue bushing 4 corresponds to the opening of the diversion duct 19.

The mode of operation of the construction according to the invention is as follows:

If the injection moulding machine the mould and injection nozzle whereof are illustrated in the drawing is used for injecting thermoplastics material, then the mould is cooled so as to achieve rapid solidification of the synthetic material injected into the hollow mould space 3 while the nozzle is heated so as to definitely prevent such solidification prior to the injection operation. When now the nozzle is brought up to the mould for the injection operation, then the cone 6 of the sprue bushing 4 moves into the conical-shaped orifice 9 of the valve body 8 and seals the latter against the escape of plastics material.

Centering of the nozzle-ward opening of the sprue runner 5 in the orifice 9 occurs at the same time. The valve piston 11 is next so displaced, either manually or automatically by the linkage 18, in the valve bore 10 that the annular groove 13 which had been situated below or above the plane of the supply passages 12 arrives in this plane. Hence the delivery of synthetic material to the annular groove 13 and through the latter to the sprue runner 5 is enabled and the synthetic material is injected in known manner into the hollow mould space 3 under the action of the injection units. The sequence of injecting the constituents of synthetic material depends upon the type of moulding being undertaken, for example the constituents may be injected concurrently in order to obtain a marbled effect with components of differing colours, or sequentially in order to introduce first the boundary material and then the core material in the sandwich method. The individual constituents combine only exteriorly of the valve region in the opening of the sprue runner 5 so that only clearly separated constituents of synthetic material are present in the annular groove 13.

After termination of the injection process the valve is closed again by displacement of the valve piston 11. By virtue of the edges of the annular groove 13 the plastics material in the sprue runner 5 is cleanly, mechanically, severed from that in the annular groove 13. Since the sprue bushing 4 has the comparatively low temperature of the mould an appreciable cooling of the plastics material contained in the sprue runner 5 and leading to its solidification has taken place already in the brief interval during which the nozzle is in the mould-engaging position. Thus, when the nozzle is separated from the mould after termination of the injection operation an exact separation of the solidified plastics material in the sprue runner 5 from the still liquid plastics material in the annular groove 13 takes place at the same time. No plastics material is left in the orifice 9 or between the peripheral area of the valve piston 11 and the opening of the sprue runner 5. In order to prevent the possibility of small quantities of plastics material being caught up in the intersection corners between the orifice 9 and the peripheral surface of the valve piston 11 the face of the sprue bushing 4 contacting the valve piston 11 matches the outer surface of the valve piston 11. This design is indicated in FIG. 2.

The injection moulding produced is now released by separation of the mould halves 1 and 2 and in so doing the solidified sprue slug is completely withdrawn from the sprue runner 5. There is no danger of insufficiently solidified synthetic material, which could lead to a reject in the subsequent injection operation, being left in the nozzle-ward end of the sprue runner 5.

Apart from its function as diversion duct for leakages the groove 20 in the cone 6 of the sprue bushing 4 assists the intended effect by reducing the area of contact between the sprue bushing and the nozzle body and thus also the heat transfer.

By virtue of the fact that the point of uniting of the two injected plastics constituents is located exclusively in the sprue runner 5, already mixed plastics constituents which could conceivably react with one another, but which in any case would impair the production of a perfect moulding in the subsequent injection operation, are prevented from being present in the annular groove 13 after termination of the injection operation. Moreover, the axially displaceable arrangement of the valve piston 11 provides considerably simplified accessability, e.g. for cleaning purposes. A further appreciable advantage resides therein that the valve piston 11 is symmetrically pressurized during the injection operation, i.e. either when liquid plastics simultaneously flows through both sections of the annular groove 13 or when a plastics constituent rests in one section under "holding pressure," and thus the piston is not unilaterally thrust against the valve bore 10. This considerably reduces valve wear.

The invention is, of course, not restricted to the above described exemplary embodiment. For example, the sprue bushing 4 may be designed to project to a greater or shorter distance relative to the mould 1, 2 so that a larger or smaller external area thereof is free. In the illustrated embodiment the area of the cylindrical part of the sprue bushing 4 between the shoulder and the cone 6 is about twice the area of contact between the cone 6 and the orifice 9. Furthermore, it is not absolutely necessary for the nozzle-ward end of the sprue bushing 4 to be of conical configuration. Optionally more than two feed passages 12 may be present, two of them then debouching in the annular groove while being separated by an interruption. Also more than one leakage grooves 20 may be provided in the cone 6.

We claim:

1. An injection moulding machine for plastic material comprising:
   a. a plurality of injection units for plastic material;
   b. a common injection nozzle for said injection units arranged to receive plastic material from said injection units and having an orifice;
   c. a valve contained in said injection nozzle;
   d. a mould defining a hollow mould space;
   e. a sprue bushing having a bore extending therethrough forming a sprue runner communicable with said hollow mould space, said bushing having a free end projecting from said mould, the free end of said bushing and the orifice of said injection nozzle being of complementary shape so that said free end is receivable within the orifice; and
   f. means for advancing and retracting said nozzle toward and from said mould, respectively, and means for placing said sprue runner and said injection nozzle in communication, wherein the point of separation between said sprue runner and the injection nozzle is located in the immediate vicinity of said valve.

2. A machine as claimed in claim 1, in which said free end of the sprue bushing and said orifice are of frustoconical shape.

3. A machine as claimed in claim 1, in which said valve comprises a cylindrical valve body displaceable in a direction extending transversely of said sprue bushing bore, and in which (the shape of the nozzle-ward end face of) said free end has an end face shaped to match the cylindrical surface of the valve body.

4. A machine as claimed in claim 1, in which(,) the free end (the shape) of said sprue bushing is shaped such that when the free end of said sprue bushing is in engagement with said injection nozzle, only said shaped free end of said bushing contacts said orifice, the sprue bushing having an external exposed surface portion between said free end and said mould.

5. A machine as claimed in claim 4, in which the area of the exposed external surface of said sprue bushing is about twice the area of contact between its free end and said injection nozzle.

6. A machine as claimed in claim 1, further comprising at least one leakage groove formed in said sprue bushing in the area of contact of said sprue bushing with said injection nozzle.

7. A machine as claimed in claim 1, in which said valve comprises
   i. a valve body displaceable in a bore extending transversely of the longitudinal axis of said sprue runner,
   ii. a plurality of supply passages from said injection units having openings which debouch into said bore in a plane extending substantially transversely of the direction of movement of the valve body, and
   iii. an annular groove in said valve body which is interrupted by protuberances between two of said openings of said supply passages as well as in the region of the point of separation between said sprue runner and said injection nozzle.

8. A machine according to claim 7, wherein said annular groove lies in a plane extending parallel to the plane of said supply passages and said interruptions in said annular groove are situated diametrically opposite one another, said annular groove having a width corresponding to the diameter of the opening of the sprue runner, and wherein said valve body has grooves provided therein at either side of said annular groove.

9. An injection moulding machine comprising an injection nozzle containing a valve, a plurality of injection units for conveying liquefied or plasticised moulding material to the injection nozzle, a mould defining a mould cavity, and a sprue runner communicating with the mould cavity and selectively communicable with the injection nozzle, said valve comprising:
   i. a bore in said injection nozzle extending transversely of the sprue runner and a valve body displaceable in said bore,
   ii. a plurality of supply passages from said injection units having openings which debouch into said bore in a plane extending substantially transversely of the direction of movement of the valve body, and
   iii. an annular groove in said valve body which is interrupted by protuberances between two of said openings of said supply passages as well as in the region of the point of separation between said sprue runner and said injection nozzle.

10. A machine as claimed in claim 9, in which said annular groove lies in a plane extending parallel to the plane of said supply passages and the interrupted portion in said annular groove are situated diametrically opposite one another.

11. A machine as claimed in claim 9, further comprising grooves in said valve body at either side of said annular groove.

12. A machine as claimed in claim 9, in which said annular groove has a width corresponding to the diameter of the opening of said sprue runner.

13. A machine as claimed in claim 9, further comprising an extension to said valve body and an actuation linkage which engages said extension for the purpose of axial displacement of said valve body.

* * * * *